Patented Oct. 18, 1938

2,133,412

UNITED STATES PATENT OFFICE 2,133,412

PETROLATUMLIKE PRODUCTS

John A. Anderson, Olympia Fields, Ill., assignor to Standard Oil Company, Chicago, Ill., a corporation of Indiana No Drawing. Application September 28, 1935, Serial No. 42,675

6 Claims. (Cl. 134—15)

This invention relates to an improved petrolatum-like product and the process of preparing the same, and in particular, to petrolatum-like products prepared from solid waxes and hydrocarbon condensation and/or hydrogenation products.

The relatively high cost of petrolatums as compared with the cost of paraffin waxes has led to many attempts to prepare artificial petrolatums by mixing paraffin waxes with oils. These attempts in the past have been unsuccessful because the paraffin wax invariably crystallizes in large plates or needles, giving coarse non-homogeneous products instead of the homogeneous and translucent properties inherent in petrolatums. I have now discovered that petrolatum-like products can be made with paraffin waxes or other waxes as a base and that these products do not crystallize in large plates or needles, but are homongeneous and possess excellent unctuous and translucent properties.

It is an object of my invention to produce an unctuous petrolatum-like product which is homogeneous and stable. It is another object of my invention to obtain a petrolatum-like unguent from paraffin and other waxes which does not crystallize in large plates and needles and, which is homogeneous and of good color.

My investigations have disclosed that excellent stable petrolatum-like products can be prepared by mixing petroleum waxes, such as paraffin wax and/or other mineral waxes such as ozocerite, ceresin, carnauba and Montan waxes, with plastic resin-like products which are chemically stable and plastic at temperatures as low as −100° F. Such products are obtained by polymerizing iso-olefins, such as gaseous or liquid olefins containing branched side chains in the molecule, for example, isobutylene with catalysts such as boron fluoride, aluminum chloride, boron chloride, zinc chloride and other gaseous or solid volatile halides of the 2nd, 5th, 6th, and 8th groups of the periodic system. Other similar products, such as polymerized normal butylene and hydrogenated rubber, may be used in place of the polymerized isobutylene product.

Stable, homogeneous petrolatum-like unctuous products are obtained by mixing together 5 to 50% isobutylene polymer or other plastic resinous materials, 20 to 85% mineral oil and 10 to 40% paraffin waxes and/or other mineral waxes.

Although any plastic resinous or resin-like material may be used to obtain the product of my invention, I prefer to use an isobutylene polymer having a molecular weight of 2000 to 10,000. I prefer to obtain the isobutylene polymer by treating isobutylene with boron fluoride at a temperature of about −80° F. under atmospheric pressure, and freeing the condensation product of boron fluoride by distillation or other suitable means.

For the purpose of illustrating my invention and not intending that it shall be limited thereby, the following examples are cited:

An excellent unctuous petrolatum-like product, which is homogeneous and stable, is obtained by mixing together 20% distillate paraffin wax of about 180° F. melting point, 70% bright stock, having a Saybolt Universal viscosity of about 180 seconds at 210° F., and 10% isobutylene polymer of about 4000 molecular weight.

Still another desirable petrolatum-like product is obtained by mixing together 10% distillate paraffin wax of about 180° F. melting point, 65% of a medicinal white oil having a viscosity of about 360 at 100° F. and 25% of isobutylene polymer of about 4000 molecular weight. The above mixes are prepared by simply melting the wax and, after stirring in the required amount of oil and isobutylene polymer, allowing the mixture to cool to room temperature.

Depending upon the consistency of the product desired waxes of lower melting point than that given in the illustrations may be used. Also the quantity and the viscosity of the oil employed may be varied to obtain the proper desired consistency. Thus waxes melting as low as 115–120° F. may be employed, alone or admixed with other waxes of various melting points. Also the color of the finished petrolatum-like product may be varied by the kind of oil used; white medicinal oils give white petrolatum-like products.

I have discovered that paper treated with the petrolatum-like products of my invention is more transparent than paper treated with paraffin wax.

If desired I may medicate the unctuous petrolatum-like product prepared in the manner above described. I have for example added medicaments, such as menthol, benzoic acid, zinc oxide, iodine, mercurochrome, tannic acid and the like to the product with beneficial results.

Although the present invention has been described in connection with details of specific examples thereof, it is not intended that these shall be regarded as limitations upon the scope of the invention, except insofar as included in the accompanying claims.

I claim:

1. As a new composition of matter an unctuous product comprising from about 10% to about 40% wax, from about 5% to about 50% of a synthetic plastic resin obtained by polymerizing an olefin with a metallic halide catalyst at a low temperature, and at least about 20% mineral oil, said constituents being combined in proportions to produce a product having petrolatum-like characteristics.

2. As a new composition of matter an unctuous product comprising from about 10% to about 40% wax, from about 5 to about 50% isobutylene polymer and at least about 20% mineral oil, said constituents being combined in proportions to produce a product having petrolatum-like characteristics.

3. As a new composition of matter an unctuous unguent comprising from about 10 to about 40% paraffin wax, from about 5 to about 50% isobutylene polymer and from about 20 to about 85% mineral oil.

4. A petrolatum-like product comprising from about 10% to about 40% mineral wax selected from the group consisting of paraffin, ozocerite, carnauba and Montan waxes, from about 5% to about 50% isobutylene polymer and from about 20% to about 85% mineral oil.

5. As a new composition of matter an unctuous petrolatum-like product comprising about 20% paraffin wax of about 180–185° F. melting point, about 70% mineral oil having a viscosity of about 180 seconds at 210° F. and about 10% isobutylene polymer of about 4000 molecular weight.

6. As a new composition of matter an unctuous unguent comprising about 10% paraffin wax of about 180–185° F. melting point, about 65% medicinal petroleum oil having a viscosity of about 350 seconds at 100° F. and about 25% isobutylene polymer of about 4000 molecular weight.

JOHN A. ANDERSON.